Jan. 7, 1969   G. WALLMANNSBERGER   3,420,189
MONOCABLE GRIP
Filed July 11, 1966
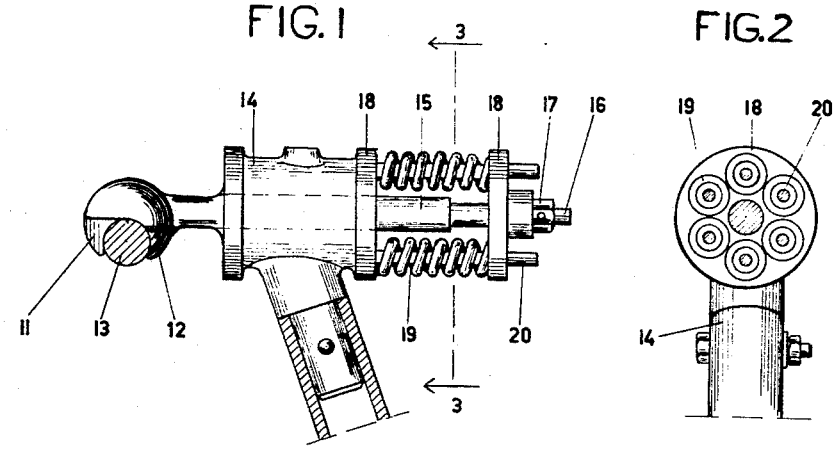
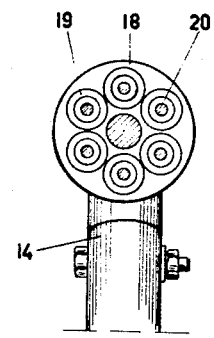
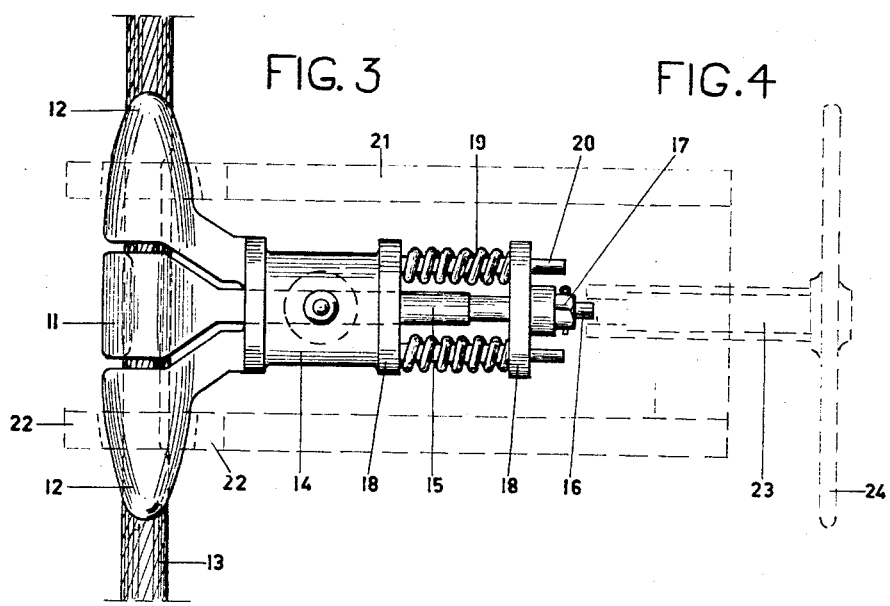
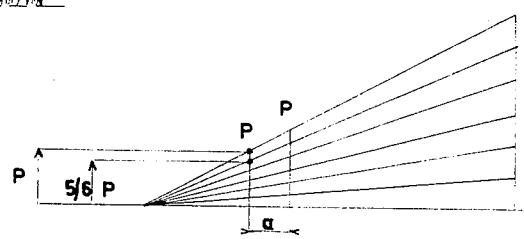

United States Patent Office 3,420,189
Patented Jan. 7, 1969

3,420,189
MONOCABLE GRIP
Georg Wallmannsberger, Spaurweg 19, Salzburg-Parsch A 5020, Austria
Filed July 11, 1966, Ser. No. 564,409
U.S. Cl. 104—202                4 Claims
Int. Cl. B61b 7/20; B61c 11/02

ABSTRACT OF THE DISCLOSURE

A monocable grip consisting of two non-movable jaws connected to a hanger adapted to grip a cable in conjunction with a movable hook-like jaw positioned therebetween. The hook-like jaw has a rearward rod extension which passes through the hanger and has a plate and nut positioning means on the end thereof. A plurality of springs mounted between the plate and the hanger for biasing the plate and hook-like jaw away from the hanger so as to clamp the cable between the two non-movable jaws and the hook-like jaw.

---

The invention presented here relates to improvements in cable grips for aerial tramways, chairlifts and T-bars operating with monocables. A number of such cable grips are fixed to a continuously operating cable at short distances from another, those distances being determined by the number of passengers the operator wishes to transport per hour. Passengers can be seated in chairs (whether designed for one, two or four passengers), in gondolas, or the passengers can be towed with T-bars.

Lifts of this type run on cables which pass over numerous supporting sheaves fixed on several towers. The sheaves guide the continuously running operating cable and the aforementioned cable grips, which in turn carry chairs, gondolas or T-bars on a hanger. A horizontal wheel is situated in each of the two terminal stations which guides the continuously operating cable around to proceed back in the opposite direction. One of these wheels is joined to a power unit. If the cable must be guided through a tower at a negative angle while continuing in the same direction, then hold-down sheaves are employed which press the cable down.

The cable grips hitherto used for continuously operating cables show inadequacies in spite of the number of models currently available. The many accidents caused by these faulty cable grips point out the need for an improved grip which guarantees safety of operation. Requirements for such safety are as follows:

First, complete safety of the total weight, including passenger(s), against slippage on the steepest inclination of the line, even when the diameter of the cable becomes reduced during operation. Further, a grip which is expertly assembled at the factory and which cannot be dismantled. This is of particular importance since all grips on the market today can be dismantled and, as is often the case, they can be reassembled improperly, leading to both time-loss and accidents.

Conventional cable grips currently available require the loosening of the whole grip in order to permit repositioning of the grip on the cable, thereby allowing the possibility of improper installation through insufficient tightening or over-tightening of the unit. The problem stems from the fact that it is impossible to see whether the grips are exactly closed, since the mechanism is hidden from view inside the grip itself.

A partial solution of this problem has been known for quite some time. It employs a system of one or two springs, which are not sufficient for proper pressure on the grip alone, and particularly should one of the springs break. FIGURE no. 5 illustrates that it is necessary to employ a number of springs in order to guarantee the required pressure between grip and cable in the event that one of the springs should fail.

The present invention comprehends a grip with a system of springs, the parts of which grip do not require dismantling during initial installation or later repositioning on the cable. This ready made cable grip contains a pressure apparatus which allows the spring pressure to be released for repositioning without requiring the dismantling of the permanently assembled grip. This feature of the new grip in question prevents accidents as have occurred due to human error in closing the grip.

The new improvements fulfill the requirements mentioned above and avoid the insufficiencies of the hitherto known models.

The accompanying drawings of a preferred embodiment of the invention illustrate:

FIG. 1 is a side view of the improved cable grip;

FIG. 2 is a transverse section taken along the line 3—3 of FIG. 1 ilustrating the springs in their position;

FIG. 3 is a top view of the whole cable grip;

FIG. 4 is an apparatus, in hidden line to release the spring system (shown in the working position on FIG. 3); and FIG. 5 is a diagram of spring system in action.

FIGS. 1 to 3 illustrate a cable grip consisting of jaws 11 and 12, which partially encircle the cable 13 and leave a part of the underside of it free. This feature is advantageous, for it permits a smooth passing of the grips over the supporting sheaves.

The non movable jaws 12 are forkshaped and are attached to hanger 14, while the jaw 11 has a main-bolt 15 on its end, complete with the thread 16 and a fixed nut 17. Between the hanger 14 and the nut 17, plates 18 are placed for the purpose of taking up several, e.g. 6 springs 19 (screw or plate springs), which springs each have a bolt 20 passing down their central axis. The springs 19 and plates 18 can be covered in transparent material to protect them from the elements (not shown).

FIG. 5 shows a diagram of 6 pressure springs wherein P stands for pressure and S stands for safety level, and from which can be seen that, in case of the failure of one of the springs, ⅚ of the total number of springs continue to function. This is 83% of the whole spring force, which again means that the 3-fold security may drop to no less than 2½-fold of the safety-level.

The space indicated by $a$ is the minimum distance the jaws must be opened to install or dismount the grip. In FIG. 4 (associated with FIG. 3), an apparatus is illustrated which is used to open the whole grip without tampering with the setting of the nuts. A frame 21 is placed in such manner above the grip so that claws 22 encircle the immovable jaw 12. In the middle of the frame 21 an adjusting screw 23 is located so that the frame can be operated by means of a two-armed lever or by a wheel 24. In this way it becomes possible to open the jaws 11 and 12 for the installation of the grip onto the cable without loosening the setting of the whole grip unit. On the other hand, it is only necessary to tighten the screw 23 slightly to reposition the grip on the cable. To avoid manual manipulation, it is also possible to use hydraulic or pneumatic portable presses which are not shown in the figures.

The present invention not only avoids the aforementioned disadvantages, but also allows clear observation from the exterior of the grip whether it is properly gripping the cable. The ready made cable grip cannot readily be opened without the use of the grip opener, thus preventing accidents due to errors and guaranteeing completely sufficient grip-pressure which insures safety of operation.

I claim as my invention:

1. A monocable grip comprising two non-movable jaws connected to a hanger, said jaws adapted to grip a cable in conjunction with a movable hook-like jaw therebetween which has a rearward rod extension passing through said hanger; plate means on the end portion of said rod extension; a plurality of springs mounted between said plate means and said hanger; and positioning means on said rod extension to position said plate means relative to said hanger and thereby preset the spring pressure exerted on the cable.

2. A monocable grip as claimed in claim 1 wherein said non-movable jaws are adapted to approximately encircle one half of the cable preventing movement of the cable toward said hanger; and said hook-like jaw is adapted to approximately encircle the other half of the cable preventing movement of the cable away from said hanger.

3. A monocable grip as claimed in claim 2 wherein said non-movable and hook-like jaws are adapted to leave a portion of the underside of the cable uncovered thereby permitting smooth passage over supporting sheaves of the cable; and further comprising a transparent protective cover over said springs, plate means and positioning means.

4. A monocable grip as claimed in claim 2 wherein said plate means and rod extension may be forced toward said hanger to compress said springs and thereby loosen or release said grip from the cable it is adapted to be fastened to.

References Cited

UNITED STATES PATENTS

| | | | |
|---|---|---|---|
| 2,026,860 | 1/1936 | Bender | 104—202 |
| 2,840,008 | 6/1958 | Lodvick | 104—202 |

ARTHUR L. LA POINT, *Primary Examiner.*

D. F. WORTH, *Assistant Examiner.*

U.S. Cl. X.R.

104—204, 210